United States Patent
Park

(10) Patent No.: US 11,228,586 B2
(45) Date of Patent: Jan. 18, 2022

(54) METHOD FOR AUTOMATING USER AUTHENTICATION ON A MOBILE APPLICATION

(71) Applicant: NDSOFT Co., Ltd., Busan (KR)

(72) Inventor: Namdo Park, Busan (KR)

(73) Assignee: NDSOFT Co., Ltd., Busan (KR)

( * ) Notice: Subject to any disclaimer, the term of this patent is extended or adjusted under 35 U.S.C. 154(b) by 213 days.

(21) Appl. No.: 16/744,159

(22) Filed: Jan. 15, 2020

(65) Prior Publication Data

US 2020/0304496 A1 Sep. 24, 2020

(30) Foreign Application Priority Data

Mar. 20, 2019 (KR) .......................... 10-2019-0031745

(51) Int. Cl.
*H04L 29/06* (2006.01)
(52) U.S. Cl.
CPC .......... *H04L 63/0853* (2013.01); *H04L 63/18* (2013.01)
(58) Field of Classification Search
CPC ................. H04L 63/0853; H04L 63/18; H04L 2463/082; H04L 63/0876; H04L 67/34; H04W 12/35; H04W 12/71; H04W 12/065; G06F 21/31
See application file for complete search history.

(56) References Cited

U.S. PATENT DOCUMENTS

| | | | |
|---|---|---|---|
| 9,503,836 B2 * | 11/2016 | Ahn | H04W 4/50 |
| 10,503,888 B2 * | 12/2019 | Spencer, III | G06F 21/316 |

FOREIGN PATENT DOCUMENTS

| | | | | |
|---|---|---|---|---|
| EP | 3065435 A1 * | 9/2016 | | H04W 12/04 |
| KR | 10-2013-0109727 A | 10/2013 | | |
| KR | 101469457 B1 * | 12/2014 | | |
| KR | 10-2017-0095758 A | 8/2017 | | |
| KR | 10-2019-0003146 A | 1/2019 | | |

OTHER PUBLICATIONS

English Translation of KR101469457B1 (Year: 2014).*

* cited by examiner

*Primary Examiner* — Alexander Lagor
*Assistant Examiner* — Wansik You

(57) ABSTRACT

Provided is a method for automatic user authentication, including: (a) a first step in which a user credential is stored on a website in the course of membership registration, wherein the user credential includes a given mobile phone number; (b) a second step in which a service application is downloaded onto a first mobile terminal, wherein the first mobile terminal is linked to the website server; and (c) a third step in which the service application is activated on the first mobile terminal through automatic user authentication without an additional membership registration process.

2 Claims, 2 Drawing Sheets

METHOD FOR AUTOMATING USER AUTHENTICATION ON A MOBILE APPLICATION

TECHNICAL FIELD

The present invention relates to a method for automating user authentication on a mobile application by invoking user login credentials from the mobile website.

More specifically, the website and the application are set to share a server in which the user login credentials are to be stored, and the said credentials are invoked from the authentication data created at the time of membership registration on the mobile website using IEMI, OS (Android, IOS) or the USIM chip embedded in the mobile terminal, Thus, according to this technology, automatic user authorization is executed without additional user login to the application.

TECHNICAL BACKGROUND

In order to gain full access to a website content, it is usually necessary for users to register on the website through the specified membership registration process. Recently, as mobile devices such as smartphones and mobile terminals are becoming increasingly popular, more goods/service providers are offering the application-based services alongside, either partly or in full scale.

However, because website and mobile application are based on different technologies, in order for a registered user of a website to access the same level of services on the application as on the website, the user necessarily take a stepwise process, that is, activating and executing the application on the mobile device and then entering their username and password created for the website to each corresponding input field in the application.

So far as membership websites are concerned, mobile application usability is increasingly limited as a user becomes more likely to lose the username and password necessary to access the website as time goes on after the membership registration.

Even with correct password, it is not unusual for one to make a wrong input in the password field on a mobile terminal, given the challenges many mobile device users experience when handling the on-screen keyboard on a mobile device. It becomes even more challenging if a valid password requires a special key(s), a minimum number of characters or both.

In Korean patent application No. 10-2012-0031707 and entitled "a method for automating user authentication on a smartphone and a system for system user authentication", the inventor(s) suggests a method for automating user authentication, in which once the user has installed the authentication application on their smartphone and then transmitted the user ID and password from smartphone through a wireless network, the user is allowed to bypass the user authentication process and to connect straight to a user terminal or another server further connected to an external online network. The detailed user authentication process includes the following steps.

First, a user authentication application is installed on a first user terminal and on a second user terminal, i.e., smartphone. Next, the user executes the user authentication application installed on the second user terminal, individually keyed in user credentials required for an access to respective online service servers, and stores the user credentials.

Next, when the user tries to access one of the online service servers from the first user terminal, the online service server transmits authentication request to the first user terminal. Upon receipt of the authentication request, the user authentication application server installed on the first user terminal is triggered to transmit the authentication request to the second user terminal.

Next, the smartphone obtains and transmits existing user's login credentials—the type of credentials that corresponds to at least any one of the working servers—to the user terminal. In response to the authentication request, the second user terminal in turn starts to run the authentication application installed on it, retrieves the user's login credential related to the online service server at issue, and send it to the first user terminal.

Next, the first user terminal transmits the user login credentials received from the second user terminal, i.e., the smartphone, to the online service server at issue, thereby having a user authentication process executed. The detailed process for obtaining and installing the authentication application include the following steps.

First, a dedicated application server running the authentication application generates a screen (of the first user terminal or of the second user terminal) on which the authentication application is displayed. Next, the dedicated application server determines whether or not the authentication application has been installed on a given device when the given device tries to connect the authentication application. The given device may be the first user terminal or a second user terminal.

Next, the user is requested to install the authentication application on the given device in case the server determines that the authentication application is not installed on the given device.

The present invention, as will be described hereinafter, is quite different from prior art stated above in terms of their technical idea and structure. The present invention is distinguished from the above-mentioned prior art in purpose and in advantages as well.

Cited references: Korean patent application No. 10-2012-0031707 and entitled "a method for automating user authentication on a smartphone and a system for system user authentication."

DETAILED DESCRIPTION

Problems to be Solved

An objective of the present invention is to propose a method for automating mobile-based user authentication by invoking user login credentials stored on a web site.

Solution to Solve the Problem

In an embodiment, provided is a method for automatic user authentication, comprising:
(a) a first step in which a user credential is stored on a website in the course of membership registration, wherein the user credential includes a given mobile phone number;
(b) a second step in which a service application is downloaded onto a first mobile terminal, wherein the first mobile terminal is linked to the website server; and
(c) a third step in which the service application is activated on the first mobile terminal through automatic user authentication without an additional membership registration process.

The step (c) includes:

(c1) a step in which, when the service application is activated for the first time on the first mobile terminal, first embedded data of the first mobile terminal is transmitted from the service application to the website server, wherein the first embedded data includes IEMI information, OS (Android, IOS) information, USIM chip information or a combination thereof, wherein the embedded data essentially includes a first phone number of the first mobile terminal;

(c2) a step in which the first embedded data, which is transmitted from the service application, is stored in the website server;

(c3) a step in which, when it is determined that the first phone number which is transmitted from the service application is identical to the given phone number which is pre-stored in the website server, first authentication data is transmitted from the website server to the service application installed on the first mobile terminal, wherein the first authentication data authorizes a user of the first mobile terminal as a registered member of the website;

(c4) a step in which the first authentication data is stored in the service application; and (c5) a step in which the service application is automatically activated on the first mobile terminal.

When the first mobile terminal is rebooted and then the service application is reactivated, the first authentication data stored in the service application is detected, and the service application is automatically reactivated on the first mobile terminal through automatic authentication.

In another embodiment, provided is a method for automatic user authentication, comprising:

(a) a step in which a service application is downloaded onto a second mobile terminal, wherein the service application is linked to a website server, wherein user credential information is pre-stored in the website server, wherein the user credential information includes first embedded data of a first mobile terminal, wherein the first embedded data includes first IEMI information, first OS (Android, IOS) information, first USIM chip information, or a combination thereof, wherein the user credential information includes a first phone number of the first mobile terminal; and (b) a step in which, the service application is activated on the second mobile terminal through automatic user authentication and without an additional user authentication process.

The step (b) includes:

(b1) a step in which it is determined whether the service application is activated for the first time on the second mobile terminal, and a step in which, when it is determined that the service application is activated for the first time on the second mobile terminal, second embedded data of the second mobile terminal is transmitted from the service application to the website server, wherein the second embedded data includes second IEMI information, second OS (Android, IOS) information, second USIM chip information, or a combination thereof, wherein the second embedded data includes a second phone number of the second mobile terminal;

(b2) a step in which the second embedded data is stored in the website server;

(b3) a step in which it is determined (i) whether the second phone number which is transmitted from the service application matches the first phone number pre-stored in the website (ii) when the second phone number matches the first phone number pre-stored in the website server, whether the first embedded data associated with the first phone number is pre-stored in the website, and (iii) when the first embedded data associated with the first phone number is found pre-stored in the website, whether the second embedded data associated with the second phone number matches the first embedded data pre-stored in the website server, a step in which, when it is determined (i) that the second phone number which is transmitted from the service application matches the first phone number pre-stored in the website, and (ii) that the first embedded data associated with the first phone number is not found pre-stored in the website, first authentication data is created and transmitted from the website server to the service application, wherein the first authentication data authorizes a user of the second mobile terminal as a registered user to the website, and a step in which, when it is determined that (i) the second phone number which is transmitted from the service application matches the first phone number pre-stored in the website server, and (iii) that the second embedded data associated with the second phone number does not match the first embedded data pre-stored in the website server, the first authentication data is discarded and second authentication data is created and transmitted from the website server to the service application installed on the second mobile terminal, wherein the second authentication data authorizes the user of the second mobile terminal as the registered user to the website;

(b4) a step in which the first or the second authentication data is stored in the service application; and (b5) a step in which the service application is automatically activated on the second mobile terminal.

In yet another embodiment, provided is a method for automatic user authentication, comprising:

a step in which a service application is selected on a second mobile terminal;

a step in which it is determined whether second authentication data associated with the second mobile terminal is found pre-stored in the service application, a step in which, when it is determined that the second authentication data associated with the second mobile terminal is found pre-stored in the service application, the service application is automatically activated on the second mobile terminal, and a step in which, when it is determined that no second authentication data associated with the second mobile terminal is found pre-stored in the service application, (i) a second phone number of the second mobile terminal, (ii) second embedded data of the second mobile terminal which includes the second phone number of the second mobile terminal, or (iii) a combination thereof is transmitted from the service application to a website server, wherein the second embedded data includes second IEMI information, second OS (Android, IOS) information, second USIM chip information, or a combination thereof, wherein the website server is associated with the service application;

a step in which it is determined whether the second phone number transmitted to the website server matches a first phone number pre-stored in the website server;

a step in which, when it is determined that the second phone number transmitted to the website server matches the first phone number pre-stored in the website server, it is determined whether the second embedded data transmitted to the website server matches first embedded data pre-stored in the website server, wherein the first embedded data is associated with the first phone number, wherein the first embedded data includes first IEMI information, first OS (Android, IOS) information, first USIM chip information, or a combination thereof;

a step in which, when it is determined that the second embedded data transmitted to the website server matches the first embedded data pre-stored in the website server, first authentication data is transmitted to the service application, wherein the first authentication data is associated with the first phone number and pre-stored in the website server;

a step in which, when it is determined that the second embedded data does not match the first embedded data, the first authentication information associated with the first phone number is discarded and second authentication data is created and transmitted from the website to the service application;

a step in which the first or the second authentication data is stored in the service application; and a step in which the service application is activated on the second mobile terminal.

Advantages of Invention

The expected effect of implementing the method for mobile-based automatic user authentication by invoking user login credentials from the website as suggested by the invention is as follows.

(1) The mobile application can be enabled or activated automatically without additional user login on the mobile terminal.

(2) The application can be enabled or activated on the user mobile terminal automatically without additional user login in the event the mobile terminal is discharged or switched off and reboots.

(3) Such advantage equally applies even when the mobile terminal is damaged or switched to a new unit as long as the original data in IEMI, O/S (Android, IOS) or the USIM chip embedded in the smartphone remain intact. Therefore, the application remains enabled to offer the same level of service as the website without requiring additional user login.

(4) Compared to the conventional application operation system, battery consumption can be significantly reduced.

BRIEF DESCRIPTION OF DRAWINGS

Hereinafter, the mechanism will be explained by which user authentication is automatically executed on the user's mobile application by invoking the user login credentials.

EMBODIMENTS

Figure 1:
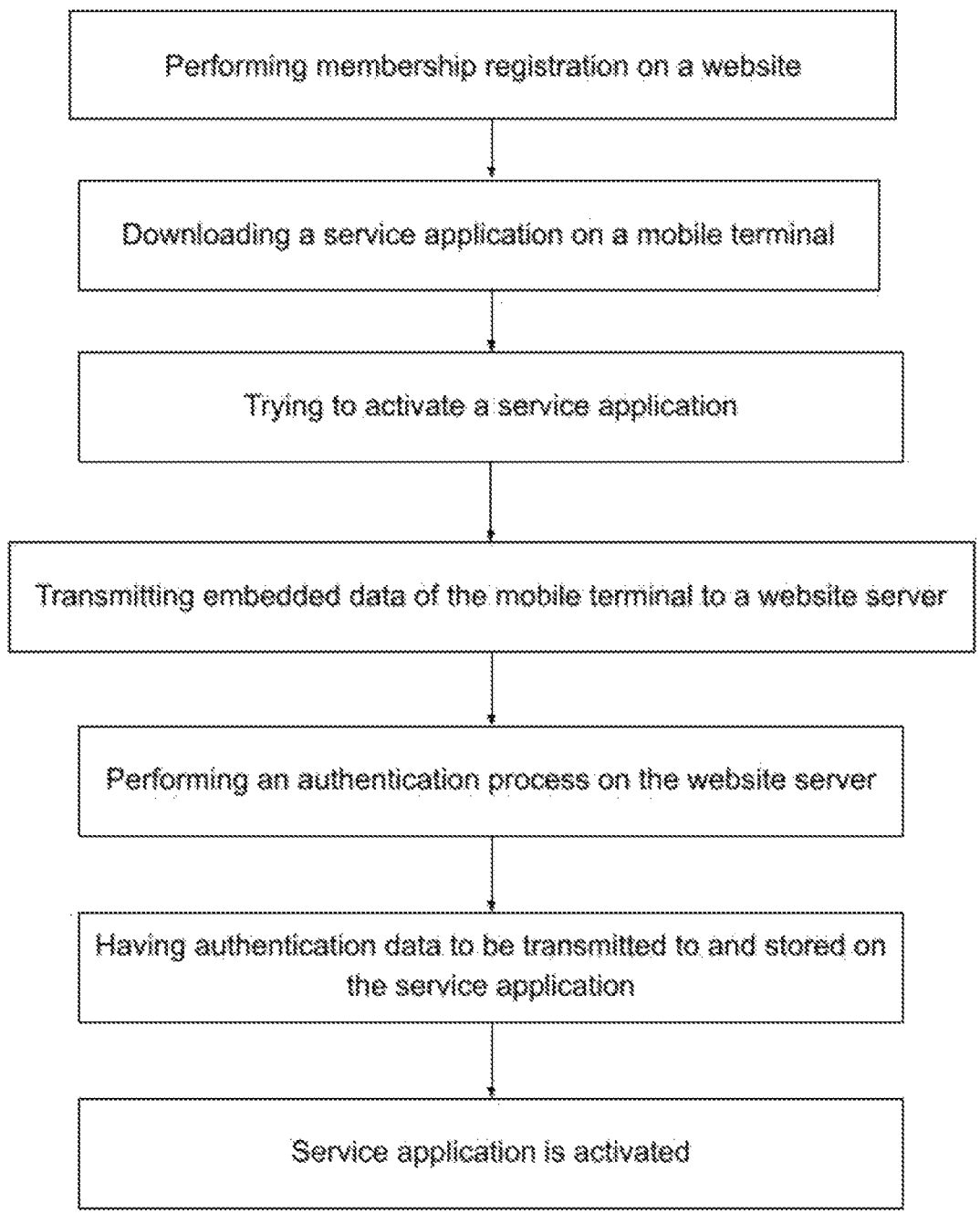
FIG. 1 describes to method for automating user authentication on a mobile application by invoking user credentials from a website, according to an embodiment of the present invention.
Figure 2:
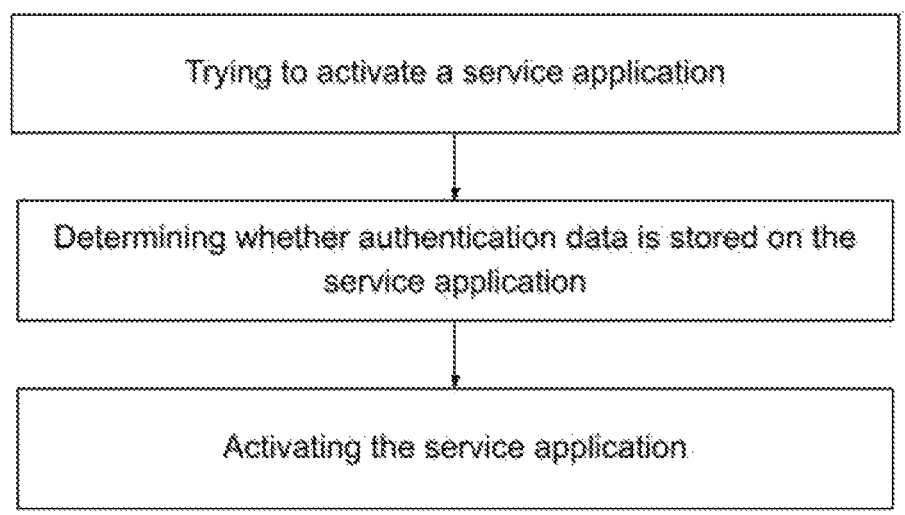
FIG. 2 describes the mechanism by which the system keeps automatic user authentication enabled internally even in the event the mobile terminal is turned off and reboots after a user had been previously authenticated by the mobile application.

The present invention is described as follows. First, a user connects to a website using a computer terminal or a mobile terminal, then completes the membership registration process in order to receive the services provided by the website.

The information generally required to complete membership registration includes a member ID, a password, a contact number, an address, an email address etc. The contact number can be the number associated with one's mobile terminal such as smartphone.

Once the membership registration process involving personal information and the terms of use on the website is complete, the user profile is created and stored in a server (also referred to as a website server) working in conjunction with the website.

Here, user's phone number which is unique to their mobile terminal during the membership registration process is necessarily required in the membership registration process to implement the present invention as intended.

Once the service application is installed and activated on his/her mobile phone, the user may avail benefits the service application provides. The service application is being associated with the website or made available by the website developer(s) for their qualified users. The exemplary websites for which an application is currently in service includes online retail stores such as Daum, Naver, Nate or various open market websites.

In reference, the service application (also referred to as "application" or "mobile application") referred to in the present invention does not need to provide as many features in terms of service and function as the corresponding website does.

Website and mobile applications are based on different technologies. Thus, in conventional art, for the user to access the services available on the mobile application, it is necessary to authenticate the user after installing the application corresponding to the website on the mobile terminal. This is carried out on the mobile application through a separate login procedure.

That is, the application becomes enabled only after the user has executed the application corresponding to the website on the mobile terminal and completed the separate login procedure. In other words, it is necessary for the user to take an additional step for login (or membership registration) on a screen of the mobile terminal.

More specifically, as exemplified as below, mobile application usability is inevitably limited due to burdensome procedures conventionally required of a user to take.

Suppose a user were a registered member of a website, say, an online retail store such as "G Market" or "Coupang" and wanted to continue the same level of services from the corresponding mobile application as from the website, he or she would necessarily install the mobile application and recall the very username and password stored on the website as the user credentials to key them in to the window specified by the mobile application as a separate login procedure. Most users, if they had ever used the application on a mobile terminal, would have experienced such hassles.

The present invention aims to bypass this hassle. According to the present invention, a user completes membership registration on a website. Then, when the user executes a mobile service application on a mobile terminal, the service application automatically authenticates the user as a registered member. So, the user runs the mobile service application without additional user login procedure and avails the service provided by the service application.

According to the present invention, the application is enabled automatically on a smartphone by invoking the user credentials pre-stored on a website. The following details the steps involved.

First, a server (also referred to as "website server") is prepared which works in conjunction with the website and the mobile application.

Next, the user connects to the website via a computer terminal or a smartphone over the internet network. Then the user introduces user's personal information required for membership registration on the website. The user's personal information includes a given phone number. During this process, the user credentials are stored in the website server which is working in conjunction with the website.

Next, the user downloads to a first mobile terminal a service application which works in conjunction with the website server and provides a service corresponding to the website.

Next, once the user executes the service application downloaded onto the first mobile terminal, it enables the service application activated with bypassing the membership registration process. Thus, services provided by the service application become readily available from the first mobile terminal. This auto-authentication process is executed according to the following steps.

(1) When the user executes the service application, which is downloaded to the first mobile terminal, for the first time, the service application fetches to the website server embedded data of the first mobile terminal, such as the IEMI, the O/S (Android, IOS), the USIM chip, or a combination thereof. The embedded data of the first mobile terminal is unique to the first mobile terminal and my include the device serial number, the first phone number, the operation information, etc. associated with the first mobile terminal. Here, the embedded data may include any information other than the "phone number", "IEME", "O/S (Android, IOS)" or "USIM chip" so long as it is unique to a mobile terminal.

(2) The embedded data sent from the service application is stored in the website server. Here, the embedded data which is fetched to and saved in the website server can be any one of IEMI, O/S (Android, IOS), the USIM chip, or the first phone number of the first mobile terminal. However, in another embodiment, the embedded data can be a combination of two or more thereof.

(3) Then, it is determined whether the first phone number transmitted from the service application matches the given phone number pre-stored (or found) in the website server. Here, the website server also checks whether the first phone number is a duplicate and thus valid as an identifier.

A phone number is considered "duplicate" when one particular phone number identifies two or more mobile terminals. In other words, one particular phone number is associated with two or more mobile terminal. This situation will be further detailed in a third embodiment of the present invention.

(4) Once it is determined that the first phone number matches the given phone number pre-stored in the website server and that the first phone number is not a duplicate, first authentication data is generated and transmitted from the website server to the service application. The first authentication data validates that a user of the first mobile terminal is a registered member of the website. In contrast, when it is determined that the first phone number is does not match any given phone number pre-stored in the website server, user authentication fails. The user will be prompted to take the membership registration process anew on the first mobile terminal.

(5) The first authentication data is stored in the service application (or in a memory of the mobile terminal through the service application). (6) The application is enabled automatically.

According to the present invention, as long as the user is a valid member of a website, the user can readily access the service application corresponding to the website from a mobile terminal anytime with no additional user login process.

Once past this step, the service application is automatically reactivated through an automatic login authentication process as long as the authentication data is stored in the service application (or in a memory of the mobile terminal through the service application).

Meanwhile, suppose the occasion, while the application is running, the mobile terminal is turned off and back on afterward. When this happens, in conventional art, it is inevitable that the user manually re-login on the mobile terminal in order to start the application over. However, according to the present invention, re-login is unnecessary for the following reasons.

First, when the mobile terminal is turned back on, the operation system of the mobile terminal is restarted. Next, when the user executes the service application on the mobile terminal, the service application searches to determine whether authentication data is pre-stored in the service application (or in a memory of the mobile terminal through the service application). Once it is determined that the authentication data is found pre-stored in the service application, the service application is automatically activated via auto-authentication.

The advantage of auto-authentication presented in the present invention equally applies in the event the mobile terminal is damaged, lost or even switched to a new mobile terminal so long as the new mobile terminal remains as being associated with the identical phone number to that of the previous mobile terminal which was lost or damaged. Hereinafter, for distinction, the lost, damaged mobile terminal is referred to as "a first mobile terminal" while the new mobile terminal is referred to as "a second mobile terminal". In this scenario, the method works as follows.

The second mobile terminal has a second phone number identical to a first phone number of the first mobile terminal. First, the user downloads the service application onto the second mobile terminal. The service application corresponds to the website and works in conjunction with the website server.

Next, upon executing the service application on the second mobile terminal, the user can access to the service provided by the service application via auto-authentication and bypasses the membership registration step. This process is carried out through the following steps.

(1) When the user executes the service application, which is downloaded and installed on the second mobile terminal, for the first time, the service application fetches second embedded data to the website server. The second embedded data is embedded in the second mobile terminal, may include IEMI, O/S (Android, IOS), USIM chip information, or a combination thereof. The second embedded data is unique to the second mobile terminal. The embedded data necessarily includes a second phone number associated with the second mobile terminal.

(2) The second embedded data transmitted from the service application (or in a memory of the mobile terminal through the service application) is stored in the website server. (3) Then, the website server checks whether the second phone number transmitted from the second mobile terminal is pre-stored in the website server. The second phone number may be included in the second embedded data transmitted from the second mobile terminal to the website server.

When it is determined that an identical phone number (say, the first phone number) is found pre-stored in the website server, then the website server compares the second embedded data transmitted from the second mobile terminal with the first embedded data pre-stored in the website.

(4) In case the second mobile terminal is a replaced phone, the second embedded data would not match the first embedded data, except for the phone number. If this is the case, the website server creates new authentication data (say, a second authentication data) which validates that the user of the second mobile terminal is a registered member of the website and sends it to the service application installed on the second mobile terminal. The existing authentication data associated with the first phone number.

(5) The second authentication data is stored in the service application (or in a memory of the mobile terminal through the service application). (6) The service application is enabled on the second mobile terminal automatically.

Below is the step-by-step description of the above embodiment. According to the method proposed in the present invention, the user first connects to the website via the first terminal and enters their personal information required for membership registration, including a first hone number associated with a first mobile terminal. During this process, the website server works in conjunction with the website, stores the user credentials, and executes user authentication automatically on the service application by invoking user login credential stored in the website server. This method includes the following steps.

In step (a), a service application is downloaded onto a second mobile terminal. In step (b), the service application is activated on the second mobile terminal through automatic user authentication and without an additional user authentication process. The step (b) includes the followings.

In (b1) step, it is determined whether the service application is activated for the first time on the second mobile terminal. When it is determined that the service application is activated for the first time on the second mobile terminal, second embedded data of the second mobile terminal is transmitted to the website server. The second embedded data includes second IEMI information, second OS (Android, IOS) information, second USIM chip information, or a combination thereof. The second embedded data includes a second phone number of the second mobile terminal.

In step (b2), the second embedded data is stored in the website server. In step (b3), it is determined (i) whether the second phone number which is transmitted from the service application matches the first phone number pre-stored in the website and (ii) whether the second embedded data associated with the second phone number is stored in the website server for the first time, When it is determined (i) that the second phone number which is transmitted from the service application matches the first phone number pre-stored in the website and (ii) that the second embedded data associated with the second phone number is stored in the website server for the first time, first authentication information is generated and transmitted from the website server to the service application. The first authentication information authorizes a user of the second mobile terminal as a registered user to the website.

When it is determined that (i) the second phone number which is transmitted from the service application matches the first phone number pre-stored in the website, and (ii) that the second embedded data transmitted from the service application does not match the first embedded data pre-stored in the website, the first authentication information is discarded and second authentication information is created and transmitted from the website server to the service application installed on the second mobile terminal. The second authentication information authorizes the user of the second mobile terminal as the registered user to the website.

In step (b4), the first or the second authentication information is stored in the service application. In step (b5), the service application is automatically activated.

That is, according to the method proposed by the present invention, even if the first mobile terminal is replaced with a second mobile terminal, as long as the second mobile terminal keeps the identical phone number as the first mobile terminal, the website server can still generate new authentication data. Accordingly, the service application which is installed on the second mobile terminal can be automatically executed.

Therefore, the user is enabled to access the service application without additional user login even in the event the first mobile terminal is replaced as long as the phone number associated with the new mobile terminal is identical to the phone number associated with the first mobile terminal.

The following summarizes the advantages of the method proposed by the present invention—the method for automating user authentication by invoking the user credentials stored in the website server, enabling the service application on the mobile terminal. In conventional art, when the mobile terminal is turned off and reboots, user re-login is necessary to enable the service application. It is because the convention methods are designed such a way that each user session requires a user login to the mobile terminal.

On the other hand, according to the method proposed by the present invention, it is possible for the user to save the trouble of having to re-login each time her/she executes the service application or even when the mobile terminal is turned off and reboots. The process involved in the present method is further detailed below. As opposed to the conventional method, in which each login initiates a user session, the website server instead generates authentication data when the user logins to the service application for the first time. The authentication data authorizes the user as a registered member. The website server then checks the validity of the authentication data each time the user tries to execute the service application. Finally, the website server finally enables the service application via the auto-authentication process.

In addition, according to conventional methods, battery consumption may remain constant or increases slightly because the user login session remains active while the service application is inactive. The login session is not terminated until the mobile terminal is turned off. According to the method proposed in the present invention, however, battery consumption can be reduced since the user session remains active only when the service application is active. Let's assume a user logs in a flight booking application, for example.

(1) In conventional art, the user session is sustained until the mobile phone is turned off. Thus, energy consumption is necessarily increased. However, according to the present invention, the user session is sustained only when the service application is in active. The user session is renewed whenever the service application is activated.

(2) In case the existing mobile terminal is replaced by a new unit, the method according to the present invention can monitor whether the website server generates duplicate authentication data. This is because the authentication data can be generated (or created) anew as needed. That is, when needed, the existing outdated authentication data is discarded and new authentication data is created.

(3) The convention system needs to keep and administer two separate and different management systems, one for the website and the other for the mobile service application, in place in order for the system to properly function. A typical example can be found in online retail stores such as "Homeplus," "SSG," etc. This is to maintain the website and the service application under optimized conditions, respectively.

Likewise, the method proposed by the present invention also requires two separate management systems. However, the present invention is distinguished in that the time required for development of the service application can be significantly reduced. While all online services are possibly implemented on the website, there are occasions as shown below in which it is better suited to embody the service on an application rather than embodying on the website.

(1) Services associated with using inherent functions or applications embedded in the mobile terminal (e.g. phone calls, text messages etc.). (2) Services requiring GPS functions provided on the mobile terminal. This service cannot be implemented on a website. (3) Services utilizing hardware acceleration functions (e.g. GPU in PC gaming). (4) Services utilizing push functions etc.

If proper, a hybrid system can better suits. That is, some service which requires speedy and instant authentication is implemented using the method proposed by the present invention while the other service is implemented on and provided through the website platform. Such hybrid system may reduce development cost and time.

When the method according to the present invention is employed, services such as voice call and video call can be instantly and simply activated by bypassing the user authentication process (login process).

The present method utilizes the embedded data retrieved from the IEMI, O/S (Android, IOS) and the USIM chip of a mobile terminal. The embedded data includes a phone number unique to the mobile terminal. A service application employing the method of the present invention is automatically enabled on the mobile terminal by comparing the phone number transmitted from the user mobile terminal with the phone number pre-stored in the website server.

Presented thus far is the step-by-step process by which this method is implemented: a service application is downloaded on the mobile terminal, and the authentication data is stored in the service application, and then automatic user authentication is performed using the authentication data stored in the service application.

To put it differently, the automatic login method according to the present invention involves the following process. (1) A step in which a service application is selected. (2) A step in which it is determined whether the authentication data is pre-stored in the service application (or in a memory of a mobile terminal through the service application) and enables the service application automatically when it is determined that the authentication data is found pre-stored in the service application. (3) When the website server determines that the authentication data is not found in the service application (or in a memory of the mobile terminal through the service application), the service application sends the imbedded data transmitted from the mobile terminal such a IEMI, O/S (Android, IOS) and the USIM chip of the mobile terminal. The imbedded data includes the phone number of the mobile terminal. (4) A step of checking whether the same phone number exists on the website server.

(5) Once the two phone numbers are found identical, then the service application compares the embedded data transmitted from the mobile terminal such as IEMI, the O/S (Android, IOS) and the USIM chip, which is unique to the mobile terminal with the corresponding date pre-stored in the website server to verify whether they match each other. (6) When any pair of the embedded data matches each other, the authentication data is transmitted to the service application. When no pair of the embedded data matches each other, the new authentication data is generated and transmitted to the service application, while the existing authentication data associated with the phone number is discarded. (7) The step in which the authentication data is stored in the service application (or in a memory of the mobile terminal through the service application), and the service application is enabled.

Therefore, the method proposed by the present invention can provide a user with great advantages in that the mobile service applications can be enabled automatically without a hassle of repeating a user authentication process.

What is claimed is:

1. A method for automatic user authentication, comprising:

(a) a step in which a service application is downloaded onto a second mobile terminal, wherein the service application is linked to a website server, wherein user credential information is pre-stored in the website server, wherein the user credential information includes first embedded data of a first mobile terminal, wherein the first embedded data includes first international mobile equipment identification (IEMI) information, first operating system (OS) information, first universal subscriber identity module (USIM) chip information, or a combination thereof, wherein the user credential information includes a first phone number of the first mobile terminal; and (b) a step in which, the service application is activated on the second mobile terminal through automatic user authentication and without an additional user login on the second mobile terminal, wherein the step (b) includes:

(b1) a step in which it is determined whether the service application is activated for the first time on the second mobile terminal, and a step in which, when it is determined that the service application is activated for the first time on the second mobile terminal, second embedded data of the second mobile terminal is transmitted from the service application to the website server, wherein the second embedded data includes second IEMI information, second OS information, second USIM chip information, or a combination thereof, wherein the second embedded data includes a second phone number of the second mobile terminal;

(b2) a step in which the second embedded data is stored in the website server;

(b3) a step in which it is determined (i) whether the second phone number which is transmitted from the service application matches the first phone number pre-stored in the website server (ii) when the second phone number matches the first phone number pre-stored in the website server, whether the first embedded data associated with the first phone number is pre-stored in the website server, and (iii) when the first embedded data associated with the first phone number is found pre-stored in the website server, whether the second embedded data associated with the second phone number matches the first embedded data pre-stored in the website server, a step in which, when it is determined (i) that the second phone number which is transmitted from the service application matches the first phone number pre-stored in the website server, and (ii) that the first embedded data associated with the first phone number is not found pre-stored in the website server, first authentication data is created and transmitted from the website server to the service application, wherein the first authentication data authorizes a user of the second mobile terminal as a registered user to the website server, and a step in which, when it is determined that (i) the second phone number which is transmitted from the service application matches the first phone number pre-stored in the website server, and (iii) that the second embedded data associated with the second phone number does not match the first embedded data pre-stored in the website server, the first authentication data is discarded and second authentication data is created and transmitted from the website server to the service application installed on the second mobile terminal, wherein the second authentication data authorizes the user of the second mobile terminal as the registered user to the website server;

(b4) a step in which the first or the second authentication data is stored in the service application; and (b5) a step in which the service application is automatically activated on the second mobile terminal.

2. A method for automatic user authentication, comprising:

a step in which a service application is selected on a second mobile terminal;

a step in which it is determined whether second authentication data associated with the second mobile terminal is found pre-stored in the service application;

a step in which, when it is determined that the second authentication data associated with the second mobile terminal is found pre-stored in the service application, the service application is automatically activated on the second mobile terminal;

a step in which, when it is determined that no second authentication data associated with the second mobile terminal is found pre-stored in the service application, (i) a second phone number of the second mobile terminal, or (ii) second embedded data of the second mobile terminal which includes the second phone number of the second mobile terminal is transmitted from the service application to a website server, wherein the second embedded data includes second international mobile equipment identification (IEMI) information, second operating system (OS) information, second universal subscriber identity module (USIM) chip information, or a combination thereof, wherein the website sever is associated with the service application;

a step in which it is determined whether the second phone number transmitted to the website server matches a first phone number pre-stored in the website server;

a step in which, when it is determined that the second phone number transmitted to the website server matches the first phone number pre-stored in the website server, it is determined whether the second embedded data transmitted to the website server matches first embedded data pre-stored in the website server, wherein the first embedded data is associated with the first phone number, wherein the first embedded data includes first IEMI information, first OS information, first USIM chip information, or a combination thereof;

a step in which, when it is determined that the second embedded data transmitted to the website server matches the first embedded data pre-stored in the website server, first authentication data is transmitted to the service application, wherein the first authentication data is associated with the first phone number and pre-stored in the website server;

a step in which, when it is determined that the second embedded data does not match the first embedded data, the first authentication data associated with the first phone number is discarded and second authentication data is created and transmitted from the website to the service application;

a step in which the first or the second authentication data is stored in the service application; and a step in which the service application is activated on the second mobile terminal.

* * * * *